United States Patent Office 3,590,127
Patented June 29, 1971

3,590,127
PROCESS OF PRODUCING EQUINE VIRAL ARTERITIS VACCINE AND PRODUCT THEREOF
John T. Bryans, William H. McCollum, and James C. Wilson, Lexington, Ky., and Elvis R. Doll, deceased, late of Lexington, Ky., by Mable R. Doll, executrix, Lexington, Ky., assignors to The University of Kentucky Research Foundation, Lexington, Ky.
No Drawing. Filed Oct. 14, 1968, Ser. No. 767,530
Int. Cl. C12k 9/00
U.S. Cl. 424—89                                    4 Claims

ABSTRACT OF THE DISCLOSURE

A process is disclosed for producing an avirulent attenuated live virus vaccine for use in immunizing horses against equine viral arteritis and for simultaneously obviating the transmission of the disease from a vaccinated horse to a non-vaccinated horse. The invention also includes the product derived from practice of the process and typical examples of the efficacy of the product are disclosed.

BACKGROUND OF THE INVENTION

Based upon research of E. R. Doll, John T. Bryans, William H. McCollum and M. E. W. Crowe (Cornell Veterinarian 47: 3–41, 1957) a filterable agent causing arteritis of horses and abortion of mares and identifiable as the Bucyrus strain of equine viral arteritis was isolated. In addition, the work of William H. McCollum, E. R. Doll and James C. Wilson reported in the American Journal of Veterinary Research, 23: 465–469, May 1961, deals not only with the Bucyrus strain, but also with the Penn strain of the virus. Since specific lesions in the small arteries of horses infected fatally by the virus were noted, the term, equine viral arteritis, was chosen to distinguish the disease from other equine diseases. Characteristic symptoms of the thus identified disease include fever, conjunctivitis, palpebral edema, congested and hemorrhagic nasal mucosa, edema of the legs, respiratory difficulty, colic, diarrhea, depression, muscular weakness and prostration. Moreover, and of especial commercial significance in the breeding of race horses, the virus may cause severe losses from abortion. An abortion incidence rate of up to 80% is not unusual and a high mortality rate potential also is found.

A further characteristic of the virus is that it is readily transmitted from one horse to another by various methods of contact, such as by nasopharyngeal secretions. Since conventional animal husbandry practices preferably do not employ the enforced isolation of animals from each other, the solution to the problem of immunizing against the disease must also solve the problem of transmission of the disease from an immunized animal to a non-immunized animal. For example, in earlier work on the development of a method for producing a live vaccine and as reported by William H. McCollum, E. R. Doll, James C. Wilson and Catherine B. Johnson (American Journal of Veterinary Research 22: 731–735 July 1961) it was found that when horses were inoculated by intramuscular injections with the Bucyrus strain of the virus passaged 46 times through horse kidney cultures alone, the virulence of the disease was reduced, but that the virus was still recoverable from nasopharyngeal secretions of the inoculated horse.

As an additional consideration in preparing a live virus vaccine to solve the problems as indicated above, it was essential that such vaccine be incapable of transmitting other viruses such as those of infectious anemia or the factor causing acute liver atropy in horses. Accordingly, the present invention relates to an attenuated live virus vaccine which does not contain any infectious agent pathogenic for horses except the virus per se.

SUMMARY

The vaccine of the invention is characterized by its ability to stimulate the production of anti-equine arteritis virus antibodies when introduced into non-immune horses and without producing the usual symptoms of infectious equine arteritis in these horses or the transmission of the disease to other horses in contact with the treated horses. The live virus contained in the vaccine has been attenuated by having been grown in rabbit kidney cultures, preferably by means of from 80 to 111 serial passages therein, after first having been grown in about 131 serial passages in horse kidney cultures.

Among the objects of the invention are the provision of an improved process for producing an equine viral arteritis vaccine; a vaccine which may be administered to horses in a wide range of dosages; a vaccine which is adaptable to immunization of horses under a wide variety of husbandry practices; a vaccine which is safe for use in horses in a wide range of dosages; a vaccine which is adaptable order of immunity to horses for periods of one year or more; a vaccine which is substantially free of serious equine pathogens other than that of equine viral arteritis; and a vaccine which does not result in significant hematological disturbances or febrile reactions in the treated horse.

DESCRIPTION OF THE PREFERRED EMBODIMENTS

The avirulent virus, or vaccine product, represented by the invention may be produced by employing certain procedures as outlined below and as indicated by the following examples.

Example A

Cell cultures were prepared from cortices of kidneys from horses of various ages according to the trypsin digest method of Youngner (Proc. Soc. Exptl. Brol. & Med. 85 (1954): 202–205). The cells were grown at 37° C. in a medium containing 10% horse serum, 0.5% lactalbumin hydrosylate and either 89.5% Eagle's medium or 89.5% Earle's solution. In Leighton tubes, 1.2 ml. of 0.5% cell suspension was used; whereas, in 32 oz. prescription bottles, 80.0 ml. was used.

The medium was replaced on the 3rd day if cultures were not seeded with virus at that time. Otherwise, when the cultures were ready for use, the nutrient medium was removed, the cell monolayer was washed once or twice with phosphate-buffered saline solution and the nutrient medium was replaced with a maintenance medium consisting of 2.0% calf serum, 0.5% lactalbumin hydrolysate and either 97.5% Eagle's medium or 97.5% Earle's solution. Penicillin (100 units (ml.) streptomycin (100 mg./ml.)), and nystatin (10 units/ml.) were used in all mediums.

The virus source was derived from the spleen of a fetus aborted by experimental infection with native Bucyrus strain of equine arteritis virus. Twenty percent suspensions of splenic tissues were prepared by mechanically chopping the tissue into fine pieces using phosphate-buffered saline solution as diluent. The supernatant liquid collected after centrifuging at 1,000 relative centrifugal force for five minutes served as the inoculum for cell cultures.

The equine kidney cultures as described and grown on cover slips contained in Leighton tubes were inoculated with supernatant fluids prepared as described. These cultures were examined microscopically each day. The fluids were collected from these cultures after 5 or 6 days, and 0.2 ml. volumes were passed to Leighton tubes containing 10-day old kidney cell cultures, and serving as the beginning of the serial passages.

One hundred thirty-one such serial passages in the horse kidney cultures were conducted in order to provide the basic inoculum of material with which the subsequent procedure as outlined in Example B was carried out.

Example B

Kidneys from healthy rabbits were dispersed according to the above trypsin digest method of Youngner. The cells were suspended in a growth medium consisting of 10% calf serum, 0.5% lactalbumin hydrolysate and 89.5% Eagle's basic medium. Leighton tubes received 1.2 ml. of cell suspension and 4-ounce prescription bottles received 15 ml. A complete replacement of growth medium was made after 3 or 4 days. When cell growth became adequate for inoculation, the growth medium was removed and replaced with a maintenance medium consisting of 2.0% calf serum, 0.5% lactalbumin hydrolysate and 97.5% Eagle's basic medium.

Penicillin (100 units per ml.), streptomycin (100 mg. per ml.) and nystatin (10 units per ml.) were employed in all mediums and inoculations were at 37° C.

Upon inoculating the rabbit kidney culture with the virus which had previously received 131 serial passages in horse kidney cultures according to Example A, the rabbit kidney culture was examined daily for 6 days at 100 magnification for cytopathic evidence of infection characteristic of arteritis virus activity. Fifty percent end points, expressed in terms of tissue culture infective doses (TCID) were calculated according to conventional methods. A serial passaging of the attenuated virus was then begun and was continued to a total of 32 such passages. In other preparations of the vaccine serial passages of 50, 80, 90, 110 and 111 in the ribbit kidney cultures were employed.

VACCINATION PROCEDURES

In employing the vaccine and in testing its results as indicated by the following tables, the immunizing viruses were injected into the cervical muscles of the horses. In general, the volume of the immunizing dose was 2 ml. and the dose of virus was adjusted to $10^4$ to $10^5$ $TCID_{50}$ by diluting in maintenance medium or trypticase broth. The rabbit kidney passage levels tested for tolerance by horses and for immunization were 32, 50, 80, 90, 110, and 111. After vaccination, the horses were observed twice daily for 10 to 16 days for signs of infection and for recording body temperatures, in some groups white blood cells and differential counts were made daily and in others, nasopharyngeal secretions were collected daily for virus recovery in tissue cultures.

For challenge inoculations, the Bucyrus strain of virus was used in the form of a 10 ml. volume instilled in the nasopharynx passage with a plastic catheter and comprising a 20% suspension of infective spleen from control horses which died of uncomplicated arteritis, 5 to 7 days after being challenged. The virus titer of the challenge inoculums ranged from $10^4$ to $10^7$ $TCID_{50}$/ml.

The efficacy of the process of preparing the vaccine and of the product produced thereby will be apparent to those skilled in the art upon consideration of the following tables indicating the results obtained from using the vaccine in the described vaccination procedures.

TABLE I

Immunization of horses with attenuated live equine viralarteritis vaccine

| Number of horses | Passage level of immunizing virus [a] | Dose of virus $TCID_{50}$ | Days from vaccination to challenge[b] | Result of challenge[c] |
|---|---|---|---|---|
| 4 | RK 50 | $2\times10^{4}$ | 21 | Immune. |
| 3 | RK 80 | $2\times10^{2}$ | 24 | Do. |
| 4 | RK 80 | $2\times10^{3}$ | 24 | Do. |
| 2 | RK 80 | $2\times10^{4}$ | 24 | Do. |
| 2 | RK 80 | $2\times10^{5}$ | 24 | Do. |
| 8 | RK 80 | $2\times10^{5}$ | 28 | Do. |
| 10 | RK 80 | $2\times10^{5.7}$ | 21 | Do. |
| 10 | RK 90 | $2\times10^{7}$ | 237 | Do. |
| 16 | RK 110 | $2\times10^{7}$ | 94 | Do. |
| 18 | RK 111 | $2\times10^{6.5}$ | 26 | Do. |

[a] Number of passages in rabbit kidney cultures following 131 passages in horse kidney cultures.

[b] Nasopharyngeal inoculation with 10 ml. of 20% suspension of spleen containing parent Bucyrus strain.

[c] These tests included 32 unvaccinated control horses. All had acute attacks of arteritis following nasopharyngeal inoculation; 17 (53%) died.

The results indicate that the vaccine appears to be uniformly active in establishing immunity and that it may be used at a diverse range of $TCID_{50}$ doses. For example, as few as $10^2$ $TCID_{50}$ doses were adequate and as much as $10^{7.5}$ $TCID_{50}$ doses were tolerated with the post vaccination reaction being comparable to that following doses below $10^5$ $TCID_{50}$.

TABLE II

Duration of immunity following intramuscular vaccination of yearling horses[a]

| Horse identity number | Time from vaccination to challenge (months) | Results of challenge inoculation[c]: Clinical response | Virus recovery on postinoculation days[d] challenge: 1 | 2 | 3 | 4 | 5 | 6 | 7 |
|---|---|---|---|---|---|---|---|---|---|
| 1,087 | 4 | Immune | — | — | — | — | — | — | — |
| 1,089 | 4 | do | — | — | — | — | — | — | — |
| 1,090 | 4 | do | — | — | — | — | — | — | — |
| 1,091 | 4 | do | — | — | — | — | — | — | — |
| 1,135[b] | 0 | Susceptible | — | — | — | — | — | — | — |
| 1,092 | 8 | Immune | + | + | + | + | 0 | 0 | 0 |
| 1,093 | 8 | do | 0 | 0 | 0 | 0 | 0 | 0 | 0 |
| 1,095 | 8 | do | + | 0 | 0 | 0 | 0 | 0 | 0 |
| 1,164[b] | 0 | Susceptible | + | + | + | + | + | D | — |
| 1,165[b] | 0 | do | + | + | + | + | D | — | — |
| 1,166[b] | 0 | do | + | + | + | + | + | 0 | 0 |
| 1,097 | 12 | Immune | + | 0 | 0 | 0 | 0 | 0 | 0 |
| 1,098 | 12 | do | 0 | 0 | 0 | 0 | 0 | 0 | 0 |
| 1,099 | 12 | do | 0 | 0 | 0 | 0 | 0 | 0 | 0 |
| 1,100 | 12 | do | 0 | 0 | 0 | 0 | 0 | 0 | 0 |
| 1,185[b] | 0 | Susceptible | + | + | + | + | + | + | + |
| 1,186[b] | 0 | do | + | + | + | + | + | + | D |

[a] Virus passaged 131 times in horse kidney and 80 times in rabbit kidney cultures. Dose was $2\times10^{4.7}$ $TCID_{50}$.

[b] Control horses.

[c] Parent Bucyrus strain—10 ml. of 20% suspension of infective spleen instilled in nasopharynx.

[d] By inoculation of tissue cultures with nasopharyngeal secretions.

NOTE.—— = No test made; + = virus recovered; D = dead horse.

The results thus indicate that a biological immunity was present in 2 of 3 horses challenged eight months after vaccination and in each of 4 horses challenged twelve months after vaccination.

TABLE III

Failure of transmission of virus from horses vaccinated intramuscularly to non-vaccinated horses kept in enforced close contact

| Number of horses in test[a]: V | C | Vaccinated horses: Dose of vaccine virus ($TCID_{50}$) | T.C. passage level[c] | Results of challenge inoculation[b] | Contact horses: Contact period (days) | Results of challenge inocula |
|---|---|---|---|---|---|---|
| 5 | 5 | $5\times10^{7.5}$ | RK 32 | All immune | 28 | All susceptible; 3 died. |
| 2 | 2 | $2\times10^{5}$ | RH 80 | do | 21 | All susceptible; 1 died. |
| 6 | 6 | $2\times10^{6}$ | RK 80 | do | 28 | Do. |
| 7 | 7 | $5\times10^{6}$ | HaK 30 | do | 21 | All susceptible; 4 died. |

[a] Vaccinated horses V and contact horses C were paired 1+1 in box stalls at the time of vaccination and kept in enforced contact for the period shown.

[b] Native Bucyrus strain, 10 ml. of 20% suspension of infective spleen instilled into the nasopharynx.

[c] RK = rabbit kidney. Viruses had been passaged 131 times in horse kidney followed by 32 or 80 passages in rabbit kidney cultures. HaK = hamster kidney. Virus had been passaged 83 times in horse kidney and 30 times in hamster kidney cultures.

During these tests each pair of horses was fed and watered from common containers and excreta was allowed to accumulate in the stalls. The results indicate that if the vaccine virus is excreted during the immediate post vaccination period, it is not excreted in sufficient quantity or in a state of virulence adequate for infecting and immunizing other horses kept in enforced close contact.

In addition to the tests upon the vaccine product indicated by Tables I, II, and III, other tests were made including dual vaccinations of pregnant mares; thermal reations of horses injected with the vaccine; and back-passage tests involving the taking of blood or plasma from inoculated horses and its injection into non-vaccinated horses to determine the efficacy of serial passages in the horse itself. Results indicate that the invention when thus utilized will not cause abortion of the fetus of the mare by the vaccine virus; that no significant febrile reactions of horses injected with the vaccine can be expected; and that the back-passage of the vaccine virus through serial passage in horses will generally provide immunity through five of such back-passages.

In view of the above disclosure, it will be noted that the several objectives of the invention are achieved and other advantageous results obtained.

What is claimed is:

1. The process of producing an attenuated vaccine for immunizing horses against equine viral arteritis which comprises introducing an inoculum of infectious equine virus into a tissue culture medium containing viable cells of horse kidney tissue, inoculating said tissue culture medium until multiplication of the virus has begun, thereafter separating an inoculum of said virus and serially passing the virus through horse kidney tissue cultures for at least about 131 passages, then serially passing the resulting attenuated virus for at least about 30 passages through rabbit kidney tissue cultures to further attenuate the virus and to produce an effective and safe live virus vaccine.

2. The process of producing an attenuated vaccine for immunizing horses against equine viral arteritis which comprises introducing an inoculum of infectious equine arteritis virus into a tissue culture medium containing viable cells of horse kidney tissue, inoculating said tissue culture medium until multiplication of the virus has begun, thereafter separating an inoculum of said virus and serially passing the virus through horse kidney tissue cultures for at least about 131 passages, and then serially passing the resulting attenuated virus through rabbit kidney tissue cultures for not less than about 32 passages and not more than about 111 passages to further attenuate the virus.

3. An infectious equine viral arteritis virus containing a multiplicity of tissue culture infectious doses of virus per milliliter capable of stimulating the production of protective infectious equine arteritis antibodies when intramuscularly injected into non-immune horses without producing the usual symptoms of infectious equine arteritis, made by the process of claim 2.

4. The product of claim 3 wherein the dose comprises an amount of virus ranging from about 20 to about $2 \times 10^{7.5}$ TCID$_{50}$ per milliliter.

References Cited

Kaschula et al.: Vet. Bull. 27, No. 2065 (1957).
Wilson et al.: Vet. Bull. 32, No. 3028 (1962).
McCollum et al.: Vet. Bull. 32, No. 3760 (1962).
McCollum et al.: Vet. Bull. 33, No. 847 (1963).
Andrews: "Viruses of Vertebrates," pp. 305–306 "Infectious Arteritis" (equine influenza) (1964).
Bryans et al.: Vet. Bull. 36, 4325 (1966).

SHEP K. ROSE, Primary Examiner

U.S. Cl. X.R.
195—1.3